United States Patent
Dalman et al.

[15] 3,692,846
[45] Sept. 19, 1972

[54] REARRANGEMENT AND DISPROPORTIONATION OF LOWER ALKYL PHENOLS

[72] Inventors: Gary W. Dalman, Fred W. Neumann, both of Midland, Mich. 48640

[73] Assignee: The Dow Chemical Company, Midland, Mich.

[22] Filed: Sept. 4, 1969

[21] Appl. No.: 855,383

[52] U.S. Cl.........260/621 D, 260/621 R, 260/621 E, 260/624 R, 260/626 R, 260/626 T
[51] Int. Cl..............................................C07c 37/12
[58] Field of Search............260/621 E, 621 D, 621 R, 624 R, 260/621 L, 624 C

[56] References Cited

UNITED STATES PATENTS

| | | |
|---|---|---|
| 1,972,599 | 9/1934 | Perkins et al. .....260/621 D X |
| 2,297,588 | 10/1942 | Stevens et al. ......260/621 D X |
| 2,603,662 | 7/1952 | Stevens..............260/621 D X |
| 2,786,873 | 3/1957 | Ohsol et al............260/621 D |

*Primary Examiner*—Leon Zitver
*Assistant Examiner*—Norman Morgenstern
*Attorney*—Griswold and Burdick, Herbert D. Knudsen and D. H. Thurston

[57] ABSTRACT

Ortho and para lower alkyl phenols are rearranged and disproportionated by heating the alkyl phenol in the presence of caustic to a temperature of 350° to 420° C. at a pressure of 2000 to 5000 psig, e.g., when heated under the conditions defined ortho cresol yields a mixture of phenol, ortho cresol, para cresol, 2,6-xylenol and 2,4-xylenol.

9 Claims, No Drawings

REARRANGEMENT AND DISPROPORTIONATION OF LOWER ALKYL PHENOLS

BACKGROUND OF THE INVENTION

The dealkylation of phenols with caustic in the presence of hydrogen and oxygen is known. Ohsol and MacKay in U. S. Pat. No. 2,786,873 teach the dealkylation of phenol by caustic in the presence of hydrogen at a temperature of about 350° to 550° C. and a pressure of about 7 to 150 atmospheres, and MacKay and Vancheri in U. S. Pat. No. 3,071,627 teach the dealkylation of O-cresol by heating at least 2 moles of sodium hydroxide per mole of o-creasol at a temperature of 300° to 450°C. for three to seven hours while passing a substantial quantity of air through the molten mixture. No rearrangement or disproportionation has been noted in such reactions.

SUMMARY OF THE INVENTION

It has now been found according to the present invention that heating ortho or para lower alkyl phenol in the presence of caustic to a temperature of 350° to 420°C. at a pressure of 2000 to 5000 psig gives a rearrangement and disproportionation reaction, e.g., under the conditions defined ortho cresol yields a mixture of phenol, ortho cresol, para cresol, 2,6-xylenol and 2,4-xylenol.

The surprising feature of the present invention is the fact that rather than getting the expected dealkylation reaction, rearrangement and disproportionation occur. Another surprising factor of the present invention is the specificity of the reaction - only the ortho and para isomers react and during the rearrangement and disproportionation, no meta isomers are formed.

In the preferred process of the invention, a lower alkyl phenol is charged into a closed reactor and an aqueous solution of caustic, preferably sodium or potassium hydroxide, is added to the reactor. The reactor is sealed and heated to the desired temperature between 350° and 420°C. for about an hour or more. The charge of reactants in the reactor is designed so that the autogenous pressure of the reactor will reach about 4000 psig at reaction temperature. After reaction, the reactor is cooled and the products are separated by conventional means, such as distillation.

The lower alkyl phenols must contain at least one lower alkyl group in the ortho or para position. Such lower alkyl groups suitably include methyl, ethyl, n-propyl and isopropyl. Representative examples of suitable alkyl phenols that may be used in the present invention include ortho and para cresol, ortho and para ethyl phenol, ortho and para n-propyl phenol, ortho and para isopropyl phenol and 2,4- and 2,6-xylenol. Higher alkyl phenols react to give such a large number of products under the conditions of the invention that none of the multitude of various products are produced in commercially feasible quantities. In the preferred practice of the invention, ortho and para cresol are rearranged and disproportionated, with the reaction of ortho cresol being of special interest.

The caustic compound used in the present invention may be any caustic material which substantially catalyzes the rearrangement and disproportionation reaction. Generally such caustic compounds are alkali metal oxides or alkali metal hydroxides with sodium and potassium hydroxide being preferred. The amount of such caustic compounds employed may vary widely, but as a rule they usually constitute 5 to 100 percent by weight of the alkyl phenol, with 10 to 50 percent by weight being preferred.

In the preferred practice of the invention, the caustic is ordinarily charged into the reactor in the form of an aqueous solution although dry caustic could be employed. The concentration of the aqueous caustic solution may vary widely, but relatively concentrated solutions (about 2–5 normal) are preferred.

The temperature of the reaction may suitably range from 350° to 420°C. Temperatures below 350° C do not produce an appreciable amount of the rearrangement reaction, and temperatures of greater than 420° C. product excessive amounts of decomposition and the resultant tar. Within this range, temperatures of 390° C to 400° C. are preferred for O-cresol.

The pressure of the reaction may vary widely the range of about 2000 to about 5000 or more psig. These pressures are ordinarily autogenous pressure obtained by adjusting the reactant charge in the reactor to give the desired pressure at reaction temperature. For the O-cresols, the preferred pressure ranges from about 3500 to about 4500 psig.

The time of the reaction may vary widely depending on the amount of conversion desired. Generally, the reaction is conducted for a period of about 15 minutes to about four hours or more. Reaction times of less than 15 minutes give little rearrangement and disproportionation, whereas reaction times of greater than four hours give increasing amounts of tar.

Thus, without the continuous addition of hydrogen or oxygen as shown by the art, heating an ortho or para lower alkyl phenol in the presence of caustic under the conditions previously defined gives a surprising rearrangement and disproportionation reaction. As a result, this novel and unexpected reaction provides a convenient and effective method of transforming such alkyl phenols to more useful products.

SPECIFIC EMBODIMENTS

Examples 1–7

Parallel experiments were conducted in a 500 ml. steel pressure reactor. The reactants were charged into the reactor and the reactor was heated to the temperatures shown in Table I under autogenous pressure. After reaction, the reactor was cooled, the reaction product was removed and the caustic reaction mixture was neutralized with concentrated hydrochloric acid to a pH of about 7. The reaction mixture was then extracted with isooctane to remove neutral products such as ethers. Concentrated hydrochloric acid was again added to the residue to a pH of about 2, and the acidified residue was extracted with benzene to obtain the phenolic products, The solvents of both extracts were evaporated and the products obtained were analyzed by gas-liquid chromatography. In some cases, the individual components of the reaction product were isolated by fractional distillation. The reactants, reaction conditions and analysis of the phenolic product are shown in Table I. In each case, unless otherwise noted in the temperature column, the pressure was approximately 4000 psig.

TABLE I

Rearrangement and Disproportionation of Ortho and Para Cresols

| Ex. | Reactant | Caustic | Water, ml. | Temp., °C. | Time, hr. | Phenol | o-Cresol | p-Cresol | 2,4-xylenol | 2,6-xylenol | Other [a] |
|---|---|---|---|---|---|---|---|---|---|---|---|
| 1 | 55 g. o-cresol | 20.3 g. NaOH | 125 | 400 | 1 | 16.7 | 23.9 | 8.8 | 20.3 | 4.4 | 25.9 |
| 2 | 84.5 g. o-cresol | 15.6 g. NaOH | 180 | 375 | 1 | 13.2 | 58.6 | 3.0 | 11.9 | 4.0 | 9.3 |
| 3 | do | 31.3 g. NaOH | 176 | 350 | 1 | 1.6 | 79 | 1.4 | | .8 | 17.2 |
| 4 | do | 31.3 g. NaOH | 176 | 400 | 1 | 16.6 | 24.5 | 8.5 | 13.3 | 4.8 | [b] 32.3 |
| 5 | 95 g. o-cresol | 8.8 g. NaOH | 180 | 375 | 1 | 6.7 | 76.7 | .5 | 6.0 | 2.3 | 8.8 |
| 6 | 19.4 g. p-cresol plus 84.5 g. phenol | 3.6 g. NaOH | 35.3 | [c] 395 | 0.5 | 74.4 | 1.8 | 12.7 | | | 11.1 |
| 7 | 19.7 g. p-cresol plus 84.5 g. phenol | 5.0 g. KOH | 40 | [c] 395 | 0.5 | 73.2 | .5 | 15.2 | 0.4 | 0.5 | 10.2 |

[a] Mostly tars.
[b] Includes 3.1% 2,4,6-trimethylphenol.
[c] At 2,500 p.s.i.g.

In the same manner as described in Examples 1–7, ortho and para ethyl phenol, ortho and para N-propyl phenol, ortho and para isopropyl phenol, 2,4-xylenol and 2,6-xylenol may be reacted with sodium hydroxide or potassium hydroxide to obtain a similar distribution of rearranged alkyl groups and disproportionation. Also in the same manner as shown in Examples 1–7, other alkali metal oxides and alkali metal hydroxides such as lithium oxide and lithium hydroxide may be employed in the reaction as the caustic to obtain results similar to those shown in Examples 1–7.

We claim:

1. A process for rearranging and disproportionating an ortho or para lower alkyl phenol consisting of heating a mixture consisting essentially of the alkyl phenol and caustic selected from the group consisting of alkali metal oxides and alkali metal hydroxides at a temperature of 350° to 420° C. and a pressure of 2000 to 5000 psig.

2. The process of claim 1 wherein the caustic is sodium hydroxide or potassium hydroxide.

3. The process of claim 1 wherein the caustic comprises 5 to 100 percent by weight of the alkyl phenol.

4. The process of claim 3 wherein the caustic is 10 to 50 percent by weight of the alkyl phenol.

5. The process of claim 1 wherein the alkyl phenol is cresol.

6. The process of claim 5 wherein the cresol is o-cresol.

7. The process of claim 6 wherein the temperature is 390° to 400° C.

8. The process of claim 6 wherein the pressure is 3500 to 4500 psig.

9. The process of claim 1 wherein the reaction time is 15 minutes to four hours.

* * * * *